United States Patent [19]

Huang

[11] Patent Number: 5,073,404

[45] Date of Patent: Dec. 17, 1991

[54] SILICA COATING COMPOSITION FOR REFLECTIVE SHEETING
[75] Inventor: Tzuli J. Huang, Woodbury, Minn.
[73] Assignee: Minnesota Mining and Manufacturing Company, Saint Paul, Minn.
[21] Appl. No.: 555,380
[22] Filed: Jul. 20, 1990

Related U.S. Application Data

[60] Continuation of Ser. No. 303,143, Jan. 30, 1989, abandoned, which is a division of Ser. No. 151,541, Feb. 18, 1988, Pat. No. 4,844,976, which is a continuation-in-part of Ser. No. 23,375, Mar. 9, 1987, Pat. No. 4,755,425.

[51] Int. Cl.$^5$ ............................................. B05D 5/06
[52] U.S. Cl. .................................... 427/39; 427/40; 427/164; 427/165; 427/322; 427/387; 427/389.7; 427/393.5; 427/397; 427/7; 252/582; 523/212
[58] Field of Search ............... 427/164, 393.5, 165, 427/322, 39–41, 389.7, 397.7, 387, 163; 523/212; 252/582

[56]  References Cited

U.S. PATENT DOCUMENTS

| | | | |
|---|---|---|---|
| 2,326,634 | 8/1943 | Gebhard et al. | 88/82 |
| 2,366,516 | 1/1945 | Geffeken et al. | 117/124 |
| 2,407,680 | 9/1946 | Palmquist et al. | 427/162 |
| 3,706,589 | 12/1972 | Fukada et al. | 427/155 |
| 3,914,469 | 10/1975 | Delano et al. | 427/164 |
| 3,940,359 | 2/1976 | Chambers | 260/29.6 F |
| 4,025,159 | 5/1977 | McGrath | 350/105 |
| 4,085,245 | 4/1978 | De Vito et al. | 428/215 |
| 4,311,763 | 1/1982 | Conroy | 428/412 |
| 4,367,920 | 1/1983 | Tung et al. | 350/105 |
| 4,390,373 | 6/1983 | White et al. | 106/287 |
| 4,409,285 | 10/1983 | Swerdlow | 428/332 |
| 4,442,177 | 4/1984 | Noda et al. | 428/412 |
| 4,476,281 | 10/1984 | Vaughn, Jr. | 524/767 |
| 4,499,217 | 2/1985 | Yoshimura et al. | 523/456 |
| 4,505,967 | 3/1985 | Bailey | 428/164 |
| 4,513,112 | 4/1985 | Ernst et al. | 524/590 |
| 4,522,958 | 6/1985 | Das et al. | 523/212 |
| 4,528,319 | 7/1985 | Ottaviani et al. | 524/540 |
| 4,554,214 | 11/1985 | Ichinomiya et al. | 428/423.1 |
| 4,576,864 | 3/1986 | Krautter et al. | 428/328 |
| 4,596,745 | 6/1986 | Chao | 428/428 |
| 4,600,735 | 7/1986 | Larsson et al. | 523/216 |
| 4,605,594 | 8/1986 | Owens et al. | 428/373 |
| 4,663,213 | 5/1987 | Bailey et al. | 428/204 |
| 4,664,966 | 5/1987 | Bailey et al. | 428/203 |
| 4,672,089 | 6/1987 | Pricone et al. | 524/384 |

FOREIGN PATENT DOCUMENTS

| | | |
|---|---|---|
| 0175031 | 3/1986 | European Pat. Off. . |
| 193269 | 9/1986 | European Pat. Off. . |
| 51-6193 | 1/1976 | Japan . |
| 55-99987 | 7/1980 | Japan . |
| 58-13620 | 1/1983 | Japan . |
| 59-015473 | 1/1984 | Japan . |
| 59-204669 | 11/1984 | Japan . |
| 60-79071 | 5/1985 | Japan . |
| 60-96682 | 5/1985 | Japan . |
| 60-137939 | 7/1985 | Japan . |
| 60-166355 | 8/1985 | Japan . |
| 60-179471 | 9/1985 | Japan . |
| 8202403 | 7/1982 | PCT Int'l Appl. . |
| 2064987 | 6/1981 | United Kingdom . |

OTHER PUBLICATIONS

Wright et al, *Solid Polyurethane Elastomers*, Maclaren & Sons, London, 1969, p. 78.
Cramm, R. H. and Bibee, D. V., "The Theory of Practice of Corona Treatment for Improving Adhesion", *TAPPI*, Aug., 1982, pp. 75–78.

*Primary Examiner*—Janyce Bell
*Attorney, Agent, or Firm*—Gary L. Griswold; Walter N. Kirn; Douglas B. Little

[57]  ABSTRACT

Retroreflective sheeting has been improved by a coating comprising silica and a transparent polymer selected from aliphatic polyurethanes, polyvinyl chloride copolymers having a minor amount of a comonomer containing at least one carboxylic acid or hydroxyl moiety, and acrylic polymers. Silica comprises 10–80 weight percent (10–70% in the case of polyacrylates) of the transparent protective coating. For example, a solution or dispersion of polyurethane is mixed with a silica sol and possibly other ingredients (e.g. wetting agent, UV light absorber and adhesion promoter), and the composition is coated onto the retroreflective sheet and dried. The coated retroreflective sheeting has superior soil and dew repellancy, retaining a higher percentage of original brightness after exposure to dirt and/or dew conditions.

6 Claims, 2 Drawing Sheets

SILICA COATING COMPOSITION FOR REFLECTIVE SHEETING

This is a continuation of application Ser. No. 07/303,143, filed Jan. 30, 1989, which is a div. of Ser. No. 151,541 filed Feb. 18, 1988, U.S. Pat. No. 4,844,976 which is a continuation-in-part of Ser. No. 023,375 filed Mar. 9, 1987, U.S. Pat. No. 4,755,425.

TECHNICAL FIELD

This invention is in the field of retroreflective sheeting and specialized coatings for such sheeting to impart soil repellency, wetting and other beneficial properties. Specifically, the invention relates to coatings containing silica and to processes for preparing the coated compositions and for applying them to retroreflective sheeting.

BACKGROUND

There are several types of retroreflective sheeting: exposed lens (as taught in U.S. Pat. Nos. 2,326,634 and 2,354,018), embedded lens (see U.S. Pat. No. 2,407,680; 4,367,920 and 4,505,967) and encapsulated lens (see U.S. Pat. No. 4,025,159). The drawings of the aforementioned patents illustrate the various sheeting types and are incorporated by reference herein. Retroreflective sheeting, in general, comprises a multiplicity of lens elements and a reflector located behind the lens elements. The lens elements may be, for example, glass or ceramic microspheres in a polymeric base sheet. The reflector may be: a layer of reflective metal (e.g. aluminum which has been vapor deposited on the lens elements or at some location behind the lens elements); flakes of reflective metal embedded in a binder layer; or a dielectric reflector as taught in U.S. Pat. No. 3,700,305.

Exposed lens retroreflective sheeting generally comprises a polymeric binder film in which is partially embedded a multiplicity of lens elements (e.g. glass microspheres), and a reflecting means disposed on the back (embedded) side of the lens elements.

Embedded or enclosed lens sheeting may be comprised of: a back reflector; an overlying transparent spacing layer; a layer of small lens elements embedded in the spacing layer and in optical connection with the reflector and spaced from it so as to place the reflector at the approximate focal point of the lens elements; a transparent covering layer conforming to the front extremities of the lens elements and having a flat front face; and an optional transparent top layer for improving weatherability.

Encapsulated lens retroreflective sheeting may, for example, be comprised of a plurality of glass microspheres having their back surfaces partially embedded in a transparent polymeric layer with a reflective layer adjacent to and disposed behind the embedded back surfaces of the microspheres and another transparent polymeric layer over the front of the microspheres and bonded to the first transparent polymeric layer in such a way as to result in air cells in front of the microspheres.

Retroreflective sheeting has many applications. Exposed lens sheeting with a dielectric reflector is used as a security film placed on top of documents such as driver's licenses, passports, and automobile titles. They can bear identifying indicia such as a state seal or watermark which can be seen at certain angles, but which do not interfere with the legibility of the document. Exposed lens sheeting is also useful as a safety item on garments to make them reflective at night, such as policeman's uniforms, fireman's coats and jogging outfits.

Both enclosed and encapsulated lens sheeting are useful in applications where they will be exposed to rain because the clear plastic layer which lies over the microspheres or other lens elements helps to prevent water films from adversely affecting the optics of the lenses. Thus, embedded lens sheeting is used in license plates and validation stickers for automobiles, and both encapsulated lens and enclosed lens sheeting have been used in highway signs and reflectors.

In use on highway signs and reflectors (e.g. pavement delineators placed on the road) it is desirable for sheeting to be soil resistant and dew repellent. The accumulation of dirt and oil from the air and road surface onto retroreflective sheeting is detrimental to the retention of its retroreflective brightness. Thus, the term "soil repellent" or "soil resistant" means reducing adherence of soil particles to the reflector surface.

It is well known that droplets of water (e.g., dew) can condense from a humid atmosphere onto a cool surface. Such condensation formed upon the surface of retroreflective sheeting impairs the transmission of light through it. The term "dew modifier" as applied to retroreflective sheeting means a material which is able to avoid a substantial decrease of retroreflective brightness due to formation of water droplets on the surface, for example by causing the dew or water to wet the surface and form a sheet or layer of water rather than droplets.

It is also desirable for the sheeting to be abrasion resistant, especially when it is to be used on the road surface. Retroreflective sheeting is applied to road surfaces in the form of pavement marking tape and as the reflective element in pavement delineators or pavement markers. In these applications, the sheeting is actually contacted by vehicle tires as they traverse the pavement markers or lane marking tape. The force of the tires, combined with any road grit, can abrade the reflective sheeting.

The use of silica coatings to modify the surface of light transmissive materials is known (e.g. antireflective coatings). However, the desired combination of soil repellency and dew modification have not yet been obtained with a silica coating that is able to tenaciously adhere to retroreflective sheeting.

DISCLOSURE OF INVENTION

Retroreflective sheeting has now been improved by applying a polymer coating containing silica. The invention is summarized as a soil resistant and dew repellent reflective sheet having a transparent protective coating comprising a mixture of silica and a transparent polymer selected from the group consisting of:

aliphatic polyurethanes, polyvinylchloride copolymers having a minor portion (i.e. less than 15 weight percent) of a comonomer containing at least one carboxylic acid or hydroxyl moiety, and acrylic polymers having a glass transition temperature (Tg) of $-20°$ to $60°$ C., preferably less than $45°$ C., wherein the silica comprises about 10-80 wt. % (10-70% in the case of acrylic polymers) of the transparent protective coating.

As used above, the term transparent means transmitting at least 90% of incident light in the visible spectrum (about 400-700nm wavelength). This has been determined using an IBM model 9420 UV-visible spectrophotometer. The inventive protective coating was applied to thin (about 20-55 micrometers thick) polyester film. The dry protective coatings on the samples used had a thickness of about 2.5 to 7.6 micrometers. The light transmittance through the uncoated polyester and through coated samples was measured at various wavelengths. In all cases there was only a small difference in light transmittance between the coated and uncoated polyester ($\leq 4\% \pm$) regardless of percent silica in the protective coating or wavelength, indicating that transmittance through the protective coating was greater than 96%.

The term aliphatic polyurethane means a polyurethane derived from at least one aliphatic polyisocyanate preferably without any aromatic polyisocyanate. Aliphatic polyisocyanates known to the art are: 1,4 cyclohexane bis(methyleneisocyanate); methylcyclohexylene diisocyanate; 1,4-cyclohexanyl diisocyanate; dicyclohexylmethane diisocyanate; 1,6-diisocyanato-2,2,4,4-tetramethylhexane; 1,6-diisocyanato-2,4,4-trimethylhexane;

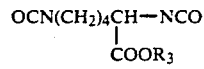

wherein $R_3$ is $-CH_3$ or $-C_2H_5$; and isophorone diisocyanate. The polyols used for aliphatic polyurethanes may be polyester or polyether polyols.

The inventive protective coating can be made permanent. For purposes of this description, the term "permanent" means a coating which is not rubbed off easily by hand and which-is not readily removed by applying common pressure-sensitive adhesive tape and lifting the tape off of the coating.

The protective coating is the last coating applied to the retroreflective sheet. The retroreflective sheet itself may comprise several layers, as described previously, and the term "top layer" will be used herein to refer to top-most layer of the retroreflective sheet just before the protective coating is applied. Thus, as to the retroreflective sheet, the light must pass first through the protective coating and next through the top layer in order to pass through the lens elements and reach the reflector. Typical top layers for retroreflective sheets are comprised of polyacrylate (e.g., polymethylmethacrylate), polyurethane (typically aliphatic polyurethane), polyvinyl (e.g., polyvinyl-chloride) or polycarbonate polymers. The protective coating of this invention has been found to adhere very well to such top films without affecting the retroreflective brightness of the sheet. The modified sheeting has good soil repellency and anti-fogging properties (i.e., dew modification) and is suitable for use in pavement markings, roadway delineators, vehicle license plates and signing products.

The mixtures which are used as coating compositions for the protective coating can be formulated by mixing various concentrations of silica sol (aquasol, hydrosol or colloidal dispersion) with aliphatic polyurethane or polyvinyl chloride copolymers in organic solvents or water dispersion. The acrylic polymers are used in the form of aqueous emulsions. Silica sol colloid particle size is an important factor for preparing a clear and transparent protective coating. The colloid particles should be less than about 50 nanometers (nm) in diameter, preferably no greater than 20 nm in diameter. In the dry protective coatings, the silica particles agglomerate, but individual particles are discernible and have been measured in the range of 0-40 nm diameter or particle size, 15-34 nm to be precise.

DETAILED DESCRIPTION

Figure 1:
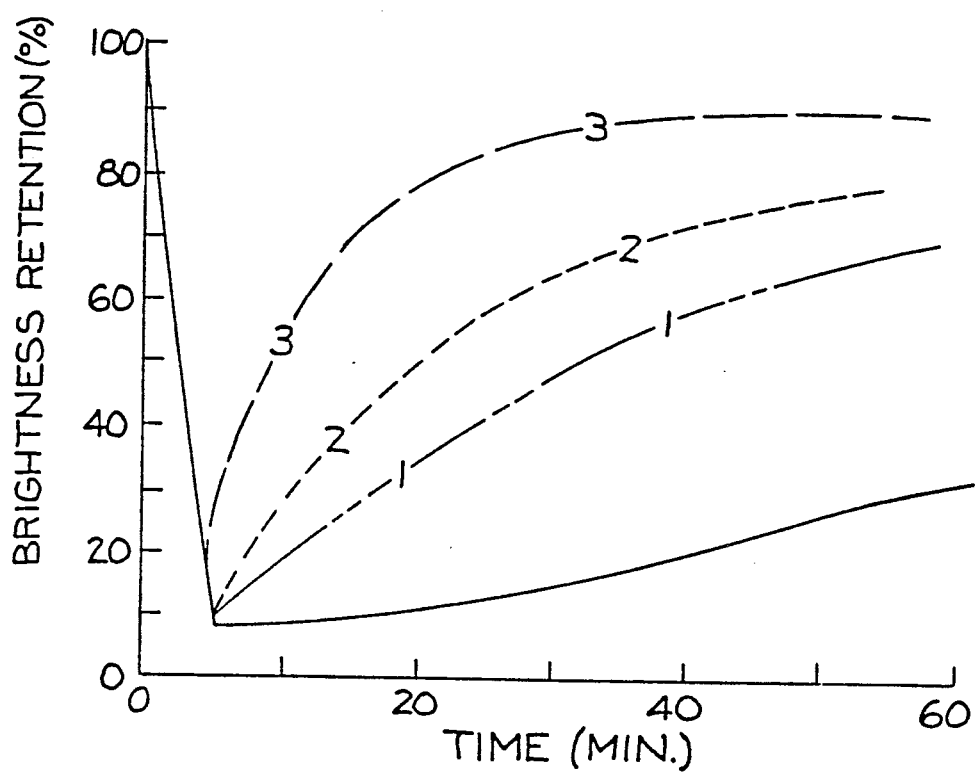
FIG. 1 is a graph of brightness retention versus time in minutes for various retroreflective sheet materials exposed to dew conditions. All of the retroreflective sheeting materials tested were of the enclosed lens type and had a vinyl top layer. All samples were exposed to the same conditions in which water droplets condensed on the sheeting surface, and the graph represents the initial loss in retroreflective brightness and the recovery of brightness over time. The solid line is for the control, Scotchlite 680 reflective sheeting, and lines Nos. 1, 2 and 3 represent various embodiments of the invention coated with a mixture comprising 30% silica, with the remainder being comprised of a polymer and (in the case of lines 2 and 3) a wetting agent.

The raw materials selected for making the inventive protective coating should not adversely affect the retroreflective sheeting to which they are applied. For example, they should not require drying conditions which would distort the sheeting and the relationship between the lens elements and the reflector. They should also not contain solvents or other ingredients which would dissolve or corrode the sheeting components. Coating mixtures containing toluene, isopropanol and/or butyl cellosolve have been found suitable for use with retroreflective sheeting.

Colloidal silica dispersions are available commercially with different colloid sizes. Two such dispersions which have been found useful are: Nyacol 1440 colloidal silica, having a colloid size of about 14 nm and a concentration of 40 weight percent silica, available from Nyacol Products, Inc., of Ashland, Md.; and Nalco 1140 silica, having a colloidal silica particle size of about 15 nm and a concentration of 40 weight percent silica in water, available from Nalco Chemical Company of Oakbrook, Ill. Both are suspended in alkaline aqueous media. Other colloidal silica dispersed in glycol ether solvent; e.g., Nalco 84SS-258 silica from Nalco Chemical Co. having a silica particle size of about 20 nm, can be used with polymer resins dissolved in organic solvent.

It is preferred that the polymer mixed with the silica sol is at least somewhat elastic, especially in cases where the retroreflective sheeting is to be applied to a flexible substrate, such as a rubber pavement marker. Several of the polymers which have been found useful are given below, (all monomer percents expressed being weight percent):

Aliphatic Polyurethanes:NeoRez R-960 Polyurethane, a flexible polyurethane sold in 33% by weight concentration in water by Polyvinyl Chemicals Inc., Division of ICI Group, Wilmington, Mass. This polyurethane is believed to be derived from the following monomers: dicyclohexylmethane diisocyanate

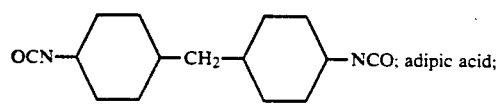

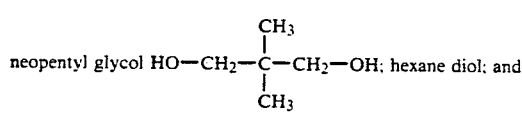

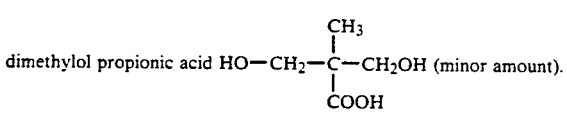

Its molecular weight is believed to be at least 200,000. When the NeoRez polyurethane is used, it has also been found useful to include an aziridine crosslinking compound to improve the physical properties of the final coating. The cross-linking compound used in the development of this invention has been CX-100 cross-linker from Polyvinyl Chemicals Inc.

Permuthane U-6729 urethane resin sold in a 1:1 mixture of isopropanol and toluene at a concentration of 25% resin by ICI Specialty Chemical Division, a member of ICI Group. This resin is believed to be derived from the following monomers: dicyclohexylmethane diisocyanate; adipic acid; neopentyl glycol; and 1,6-hexanediol. It is believed to have a weight average molecular weight (Mw) of about 33,000 and a number average molecular weight (Mn) of about 11,000.

Permuthane U-23-327 urethane resin sold in a 1:1 mixture of isopropanol and toluene or methyl cellosolve at a concentration of about 35% resin by Beatrice.

Although the polyurethanes used in making this invention have not been the radiation curable variety, e.g. with acrylate or methacrylate end groups, such polyurethanes may be used.

The molecular weight of the polyurethane is preferably over 20,000.

Polyvinyl chloride copolymers:

VROH copolymer, believed to have the following monomer content: vinyl chloride (79-83%), vinyl acetate (5%), and vinyl alcohol (≦15%). It is said to have 1.8-2.2% by weight hydroxyl content.

VMCH Copolymer believed to have the following monomer content: vinyl chloride (85-88%), maleic acid (0.8-1.2%) and vinyl acetate (about 13%). Besides maleic acid, acrylic and methacrylic acids may be incorporated into the useful polyvinyl chloride copolymers.

VAGH partially hydrolyzed copolymer believed to have the following monomer content: vinyl chloride (89.5-91.5%), vinyl acetate (3%) and vinyl alcohol (5.2-6.5%). VROH, VMCH and VAGH copolymers are available from Union Carbide Corporation.

Acrylic Polymers:
NeoCryl A601 polymer,
NeoCryl A612 polymer, and
NeoCryl A614 polymer.

These polymers are believed to be copolymers of methyl methacrylate and butyl methacrylate having a weight ratio of methyl methacrylate units to butyl methacrylate units in the polymer in the range of 0.25-0.6. The ratio for the three named polymers are believed to be as shown below:

|  | Weight ratio of monomeric units in polymer methyl methacrylate/butyl methacrylate |
| --- | --- |
| NeoCryl A601 | 0.33 |
| NeoCryl A612 | 0.43 |
| NeoCryl A614 | 0.47 |

The molecular weights of the polymers is typically: Mw in the range of 300,000-350,000 g/mole and Mn in the range of 50,000-70,000 g/mole. Analyses of two of the NeoCryl polymers indicates the following molecular weights:

|  | Mw | Mn |
| --- | --- | --- |
| NeoCryl A612 | 323,000 | 60,000 |
| NeoCryl A614 | 304,000 | 54,000 |

All three NeoCryl polymers were obtained from Polyvinyl Chemical Industries in water emulsion form. These emulsions have a pH similar to that of the silica sols with which they are used, and they form a relatively stable mixture with the silica sols mentioned herein in examples with the acrylates. These emulsions are characterized by: 32 weight percent solids, pH of 7.7-8.0, viscosity at 25° C. of 100-200 centipoise, and specific gravity of 1.0. They are also believed to contain anionic surfactants and some organic solvents (11-14 weight percent) said by the manufacturer to be coalescing solvents, as follows:

|  | A612 | A614 | A601 |
| --- | --- | --- | --- |
| aromatic naphtha | 4.3% | 3.7% | 4.8% |
| 2-butoxyethanol | 1.3% | 1.1% | — |
| 2-(2-ethoxyethoxy)ethanol | 2.2% | 1.9% | — |
| 2-methoxypropanol | 5.0% | 4.3% | — |
| ethylene glycol | 1.0% | 0.8% | — |
| diacetone alcohol | — | — | 7.9% |

Coalescing solvents have an affinity for the polymer and water and a higher boiling point, at atmospheric pressure, than water.

The NeoCryl acrylic polymers can be blended with the NeoRez polyurethanes to form a clear coating with colloidal silica. Such blends (e.g., 2:1 weight ratio of acrylate to polyurethane) have been found to have excellent transparency (light transmittance), flexibility and adhesion.

Other compounds which have been found useful for incorporation into the coating composition of this invention are:

Polyalkylene oxide modified dimethylpolysiloxanes which are polymeric wetting agents sold under the trademark Silwet ® by Union Carbide Corporation.

The general formula for Silwet copolymers stated in Union Carbide literature is:

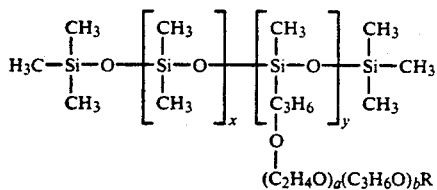

Ultraviolet light stabilizers or absorbers, to improve the stability and weatherability of the protective coating. One suitable ultraviolet light absorber is Uvinul N-539 from GAF, New York, N.Y. whose literature indicates that its formula is

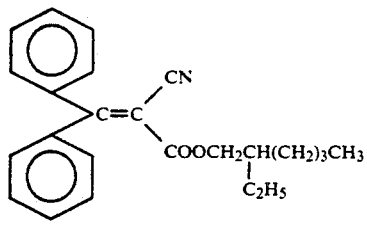

2-ethylhexyl-2-cyano-3,3-diphenyl acrylate Uvinul N-539 has been used with aliphatic polyurethane polymers. Tinuvin 328 general purpose UV absorber by Ciba-Geigy Corporation of Ardsley, N.Y. has been used with acrylate polymers. Ciba-Geigy literature indicates that Tinuvin 328 light absorber has the following formula:

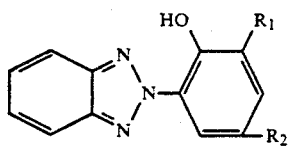

wherein $R_1$ and $R_2$ are t-amyl.

A retroreflective sheeting used in reducing the invention to practice was a wide angle flat top sheet which comprises, in general: a back reflector of vapor deposited aluminum; an overlying transparent matrix; a light-returning layer of transparent microspheres embedded in the transparent matrix and in optical connection with the reflector but spaced from it so as to place the reflector at the approximate focal point of the microspheres; and a transparent overlying solid covering which conforms to the front extremities of the microspheres and has a flat front face. Such sheeting reflects a cone of light back toward a light source even though the incident light beam strikes the sheeting at an angle.

Wide angle flat top retroreflective sheeting may be made, for example, by a solution casting technique comprising the following process steps: (a) providing a paper carrier web coated with a release agent such as polyethylene; (b) coating the release agent side of the carrier web with a 25% solids solution of fully reacted aliphatic elastomeric polyurethane of the polyester type in an isopropanol, toluene, xylene solvent in sufficient amount to yield about a 50 micrometers dry film thickness; (c) drying the coating from step (b) for example at about 90 C for 15 minutes; (d) applying a bead bond coat about 5 micrometers thick of the same polyurethane material used in step (b) to the dry coating from step (c) and contacting the wet polyurethane surface with glass microspheres (e.g., about 20-120 micrometers diameter and 1.9-2.5 refractive index); (e) drying the microsphere-coated web for example at 93 C for 5 minutes; (f) coating a spacing layer polymer of the same aliphatic elastomeric polyurethane composition onto the microsphere-covered web or sheet from step (e) in sufficient amount to yield a dry film thickness about equal to the focal length of the microspheres; (g) drying the sheeting from step (f); (h) vapor coating the spacing layer with a specularly reflective material (e.g., aluminum); (i) removing the paper carrier web; and (j) coating the back side of the reflective material with an acrylate-base pressure-sensitive adhesive having a silicone coated release liner.

The soil resistant reflective sheeting of this invention is prepared by the following steps:

A. The protective coating composition is prepared by mixing colloidal silica with one of the selected polymers, such as polyurethane, and any other desired ingredients, such as light stabilizer or cross-linking agent;

B. A retroreflective sheet is provided, and it is coated with the protective coating composition by conventional means, such as a wire wound bar, knife coating, coating roll or dip coating; and C. The wet coating from step B is dried and cured by placing the retroreflective sheet in an oven.

The details of each of the above steps will now be explained. In one preferred sequence for step A, the protective coating composition is prepared as follows:

(1) Dilute Permuthane U-6729 polyurethane solution with a 1:1 volume ratio mixture of toluene and isopropanol to about 25% concentration.

(2) Add light stabilizer in solution form to the solution from step (1).

(3) To the solution from step (2), slowly add colloidal silica (30% solids) and mix.

(4) To the mixture from step (3), add hydrophilic Silwet L-77 siloxane wetting agent and mix.

(5) Mix in minor amount (<10 weight percent) of Silane Xl-6106 adhesion promoter from Dow Corning Corporation and mix gently to obtain a homogeneous colloidal silica suspension.

It is generally desirable not to add the colloidal silica as the last part of step A, because small gel particles can be formed, and the coating may become hazy. However, in the case of acrylate polymers, the silica should be added last. The concentration of $SiO_2$ in the final dry coating is typically between about 15 and 60 weight percent.

When using the polyvinyl chloride transparent polymers, they are normally furnished dissolved in organic solvent (e.g. 10 weight percent in methyl ethyl ketone). In that case, silica is also furnished in an organic medium, e.g. Nalco 84SS-258 colloidal $SiO_2$ dispersion in glycol ether.

The protective coating has good adhesion to retroreflective sheeting with a polyurethane top layer. However, for retroreflective sheeting with a polyacrylate top layer, it has been found desirable to pretreat the sheeting with corona treatment to improve adhesion between the sheeting and the protective coating. A general discussion of corona treatment of webs for improving adhesion is found in Cramm, R. H. and Bibee, D. V., "The Theory and Practice of Corona Treatment for Improving Adhesion", TAPPI, Aug., 1982, pp. 75-78. The apparatus used in such corona treatment has been a Softal-Electric Company machine from West Germany, Model 3025DW, having 1.2 Kw maximum power and electrode 0.56 m long. Sheeting has been treated using a current of 180-300 milliamps and drawing the sheeting through the apparatus at a rate of 10-100 m/min. for a sheet about 0.3 m wide. One typical treatment level is about 14 Watts/ft$^2$/min. (150w/m$^2$/min).

The concentration ranges for the minor ingredients in the protective coating composition are: for the hydrophilic siloxane, 0-5 weight percent, preferably about 3%; for the silane adhesion promoter 0-3%; and for the light stabilizer 0-6 weight percent, preferably 2-4%.

The conditions for step C are generally about 50°-93° C. for 1-5 minutes in an air atmosphere. Generally, retroreflective sheeting having a polyurethane top layer can withstand somewhat higher temperatures, and a curing condition of 93° C. for 2-3 minutes is appropriate. However, in the case of polyacrylate top layers, conditions are preferably about 65°-71° C. for 1-3 minutes. Thickness of the final protective coating is generally less than 150 micrometers.

The invention will be further clarified by the following examples, which are intended to be purely exemplary. In the examples, percentages of protective coating constituents are expressed as weight percent taking the total of SiO$_2$ and the transparent polymer (e.g., polyurethane or polyvinylchloride copolymer) as 100%.

Example I

In the case of the vinyl resins used in this invention, the stability of the protective coating composition (as measured by retention of brightness) has been found somewhat dependent on SiO$_2$ concentration. This is shown by the following table:

TABLE 1

| Sample | Vinyl Resin | SiO$_2$ Wt % | Brightness Retention (%) |
|---|---|---|---|
| A | VAGH | 20 | 98 |
| B | VAGH | 30 | 95 |
| C | VAGH | 40 | 86 |
| D | VAGH | 50 | 26 |
| E | VMCH2 | 20 | 102 |
| F | VMCH2 | 30 | 102 |
| G | VMCH2 | 40 | 100 |
| H | VMCH2 | 50 | 96 |

The above data show that the SiO$_2$ is quite stable in the VMCH$_2$ vinyl resin from Union Carbide Corporation; whereas, above 30 weight percent concentration, it becomes less stable in the VAGH resin. A white precipitate was formed in some of the VAGH resin mixtures. Therefore, within the class of vinyl copolymers described, some experimentation is required to discern those which are useful and the concentration limits within which they are useful.

EXAMPLE II

In soil repellency tests, retroreflective sheeting samples were mechanically splashed with road dirt and water containing a trace amount of vehicle motor oil. The retroreflectivity retention of splashed and dried specimens was tested using a retroluminometer after each test cycle. The brightness retention corresponding to each test cycle is shown in Table 2 below:

TABLE 2

| Sample | Control | 23-A | 27-A | 27-B | 27-F |
|---|---|---|---|---|---|
| Wt % SiO$_2$ | 0 | 33 | 33 | 25 | 60 |
| Silwet Siloxane | no | no | yes | yes | yes |
| Organic base | — | — | x | x | x |
| H$_2$O base | — | x | — | — | — |
| % Initial Brightness Retained after: | | | | | |
| 1st cycle | 58 | 75 | 92 | 91 | 91 |
| 2nd cycle | 42 | 68 | 88 | 86 | 87 |
| 3rd cycle | 44 | 75 | 85 | 86 | 85 |
| 4th cycle | 46 | 76 | 83 | 82 | 81 |

In the above table, the control was an encapsulated lens retroreflective sheeting which is used in traffic signs, and all of the other samples were specimens of the same type of sheeting modified in accordance with this invention. In each of the inventive samples, the transparent polymer used was a polyurethane, and the term organic base means that the polyurethane was dissolved in organic solvent, while the term H$_2$O base means that the polyurethane was dispersed in water. The data show that the inventive retroreflective sheeting samples retained more than 80% of their initial brightness, while the uncoated control retained only about 46%. The data also indicate that the presence of a small amount of the hydrophilic siloxane wetting agent may enhance the soil repellency without adversely affecting brightness.

Example III

Dew tests were performed in accordance with the following procedure. Samples of retroreflective sheeting were laminated to aluminum panels which were placed in direct contact with the outside surface of a rectangular, galvanized metal box filled with ice water. As the samples cooled, moisture in the air gradually condensed on their surfaces to form water droplets. A portable retroreflectometer was used to monitor the brightness of the sheeting samples over time. The retroreflectometer used was made by Retro-Tech of La Mesa, Calif., and it reads in units of candela per lux-meters squared (cd/lux-m$^2$). The results are indicated on FIG. 1 attached. The solid line is the plot for the control sample, Scotchlite 680 retroreflective sheeting. The other three plots are for specimens which were the same as the control, except that they had been coated with the inventive protective coating. In all three of those cases, the concentration of SiO$_2$ was about 30%. For line no. 1, the protective coating contained no siloxane wetting agent. For line 2, the protective coating contained 3 weight percent Silwet siloxane wetting agent, and for the specimen represented in line 3, the protective coating contained 5 weight percent Silwet wetting agent.

From FIG. 1, one can see that the initial loss of brightness over approximately the first five minutes was about the same for all four of the test specimens, but the recovery of brightness was quite different. It is evident that the wetting agent helps in the rapid recovery of brightness, since specimen 3 recovered about 87% of its brightness in 30 minutes. In other similar tests in which all conditions were kept constant except for silica concentration, it was found that specimens with higher silica content appeared to retain more of their brightness and recover a greater percentage of original brightness over time.

Thus, the protective coating has been made hydrophilic. That is, it is readily wetted by water. Hydrophilic nature can be measured by the change in contact angle of a drop of water on the surface, over time, i.e. the angle between the side of the drop and the surface at the perimeter of the drop. For example, a contact angle which increases over time or remains high (e.g. over 70) would exemplify a hydrophobic surface, whereas, a contact angle which decreases over time or remains low would exemplify a hydrophilic material. That is, on hydrophilic surfaces, water drops tend to spread out, while, on hydrophobic surfaces, water tends to form beads.

Although the protective coating can be made hydrophilic, it resists absorption of water deep into the coating where it could cause opacity. In dew or rain conditions and even after immersion in water, the inventive retroreflective sheet remains clear and transparent, wet with water drops on its surface.

EXAMPLE IV

Various embodiments of the retroreflective sheeting were made using the coating compositions as shown in Table 3 below. In each case, the coating composition was prepared by first mixing the polyurethane solution and silica sol together, adding the light absorber, then adding the siloxane wetting agent (if used). Finally, the silane adhesion promoter (if used) was added. In each case the coating composition was applied to the same type of retroreflective sheeting which was used in Example II. All of the coating compositions were coated by means of a wire wound coating bar (wire 0.914 mm diameter). the coated samples were dried in a forced air oven at about 66° C. for about 3-4 minutes. Each sample was subjected to an adhesion test similar to ASTM Test No. D-3359, using Scotch® 610 adhesive tape. The cross-hatch or lattice pattern was made in the coating samples and the adhesive tape was applied and removed in a similar manner to the ASTM Test, but results were reported as adhesion failure percent. That is, by visual observation, an estimate was made of how much of the protective coating was lifted off by the tape, indicating adhesive failure. The results reported are the average of more than three specimens. The adhesion test results and the compositions of the samples are reported in Table 3 below:

moter helps to overcome that effect. The adhesion of the inventive sheeting without either the wetting agent or the adhesion promoter appeared to be excellent.

In another test, the same type of retroreflective sheeting was treated with corona discharge and then coated with colloidal silica sol and dried at 66° C. or 93° C. for 3 minutes. The adhesion test showed poor adhesion of the resulting silica coating to the top layer of the reflective sheet, and the silica could be removed completely by wiping it with wet paper.

EXAMPLE V

Accelerated weathering tests have been conducted in QUV and KRC weatherometers. The results of the first 500 hours testing showed 90%-95% brightness retention for the inventive retroreflective sheet in which the protective coating contained 0.5%-1.5% Tinuvin 328 light stabilizer.

EXAMPLE VI

Acrylic polymers have been tested by making several protective coating compositions with them, making the treated retroreflective sheeting of the invention and measuring the brightness of the sheeting both before and after the application of the protective coating composition. The reflective sheeting used was Scotchlite 3870 high intensity sheeting. In addition, another acrylic polymer (Rhoplex E-1895) was used instead of the NeoCryl acrylic polymers in one of the experiments. The results are shown in Table 4 below.

TABLE 4

Colloidal Silica Containing Polyacrylate Coating

|  | 22-A | 22-B | 22-C | 22-D | 22-E |
|---|---|---|---|---|---|
| NeoCryl A614 | 30 g | 40 g | — | — | — |
| NeoCryl A612 | — | — | 30 g | — | — |
| NeoCryl A601 | — | — | — | 30 g | — |
| Rhoplex E-1895 | — | — | — | — | 20 g |
| Nalco 1140 (40% SiO$_2$) | 24 g | 13.7 g | 24 g | 24 g | 25 g |
| Coating Weight Percent SiO$_2$ | 50 | 30 | 50 | 50 | — |
| Initial Brightness (cd/lux-m$^2$) | 300 | 300 | 304 | 300 | 302 |
| Brightness of Treated Sheeting | 308 | 304 | 303 | 305 | 18 |
| Brightness Retention (%) | 100 | 100 | 100 | 100 | 6 |

The above data demonstrate that the inventive acrylate-silica coatings do not diminish the retroreflective brightness of the sheeting; whereas, the coating made with the Rhoplex polyacrylate emulsion resin was unsatisfactory since it reduced brightness substantially.

TABLE 3

| Sample | Polyurethane 25% Solids wt (g) | Polyurethane 25% Solids % of final coating solids | Toluene/ Isopropanol 1:1 wt (g) | SiO$_2$ sol (30% in glycol ether solvent) % of final coating solids | Tinuvin light absorber % of final coating solids | Siloxane wetting agent % of final coating solids | Silane* adhesion promoter % of final coating solids | Adhesion failure % |
|---|---|---|---|---|---|---|---|---|
| 1 | 50 | 70 | 50 | 30 | 2 | | | 0 |
| 2 | 200 | 70 | 200 | 30 | 4 | | | 0 |
| 3 | 200 | 50 | 200 | 50 | 4 | | | 0 |
| 4 | 25 | 70 | 25 | 30 | 4 | 5 | | 100 |
| 5 | 25 | 70 | 25 | 30 | 4 | 3 | 2 | 10 |
| 6 | 25 | 70 | 25 | 30 | 4 | 5 | 2 | 30 |
| 7 | 25 | 70 | 25 | 30 | 4 | 8 | 2 | 100 |
| 8 | 25 | 50 | 25 | 50 | 4 | 5 | | 5 |
| 9 | 25 | 50 | 25 | 50 | 4 | 3 | 2 | 0 |
| 10 | 25 | 50 | 25 | 50 | 4 | 5 | 2 | 40 |
| 11 | 25 | 50 | 25 | 50 | 4 | 8 | 2 | 100 |

*Added as 20% solution in isopropanol (75%) and H$_2$O (5%).
Weight reported is silane component only.

The above data show that, in general, increasing concentration of the siloxane wetting agent is detrimental to adhesion, while adding the silane adhesion pro-

EXAMPLE VII

Figure 2:
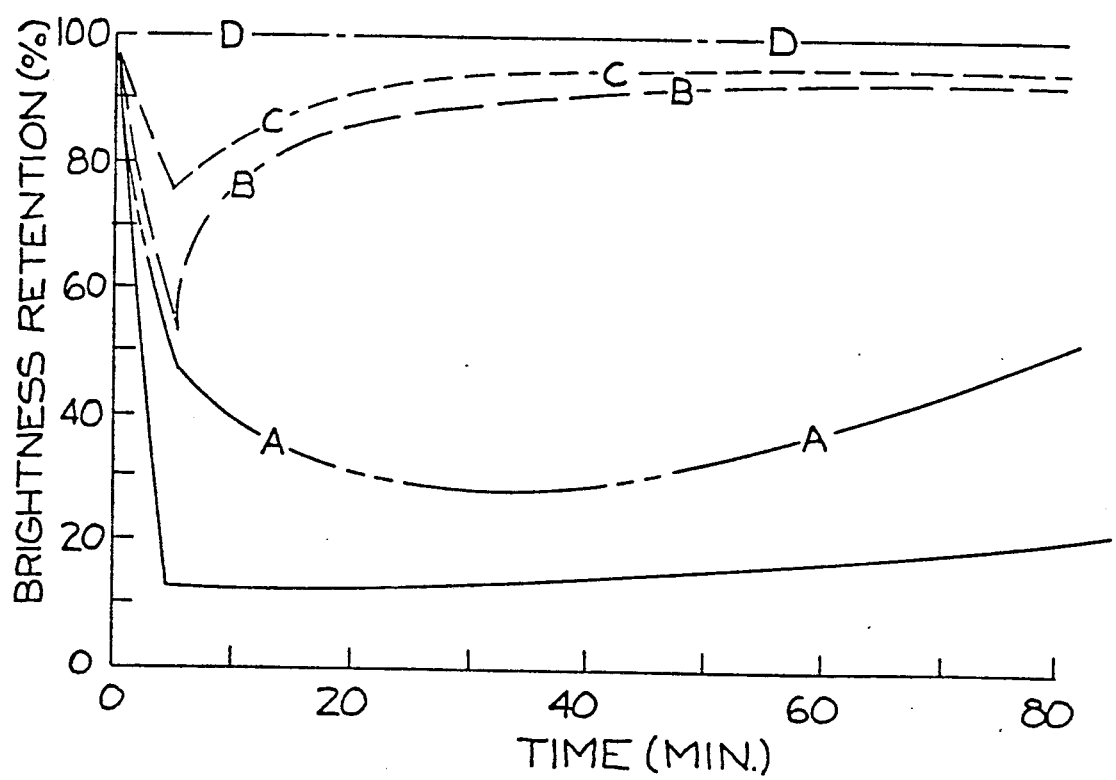
FIG. 2 is a graph of brightness retention vs. time, similar to FIG. 1, except that the polymer used was NeoCryl A601 acrylic polymer from Polyvinyl Chemical Industries, Division of the ICI Group, and the reflective sheeting was Scotchlite 3870 reflective sheeting, from Minnesota Mining and Manufacturing Company. The solid line represents the uncoated control. Line A represents the same sheeting coated with NeoCryl A601 polymer. Lines B-D represent embodiments of this invention using coatings comprising NeoCryl A601 polymer and silica in varying amounts.

Dew tests were performed like those described in Example III on samples of the inventive reflective sheeting made with the acrylate polymers, and the results are shown in FIG. 2. The samples for lines B, C and D had 15 percent, 30 percent and 50 weight percent silica in the protective coating respectively. FIG. 2 shows that the specimens treated with the mixture of acrylate polymer and colloidal silica lost less reflectivity and recovered it more quickly than untreated sheeting. With about 50 weight percent silica in the coating, specimen D of this Example lost virtually no brightness throughout the test. However, without the presence of the colloidal silica particles, the reflective sheeting, even with the acrylate polymer (line A) lost substantial brightness, and reflectivity recovery of the specimen was slow.

EXAMPLE VIII

Figure 3:
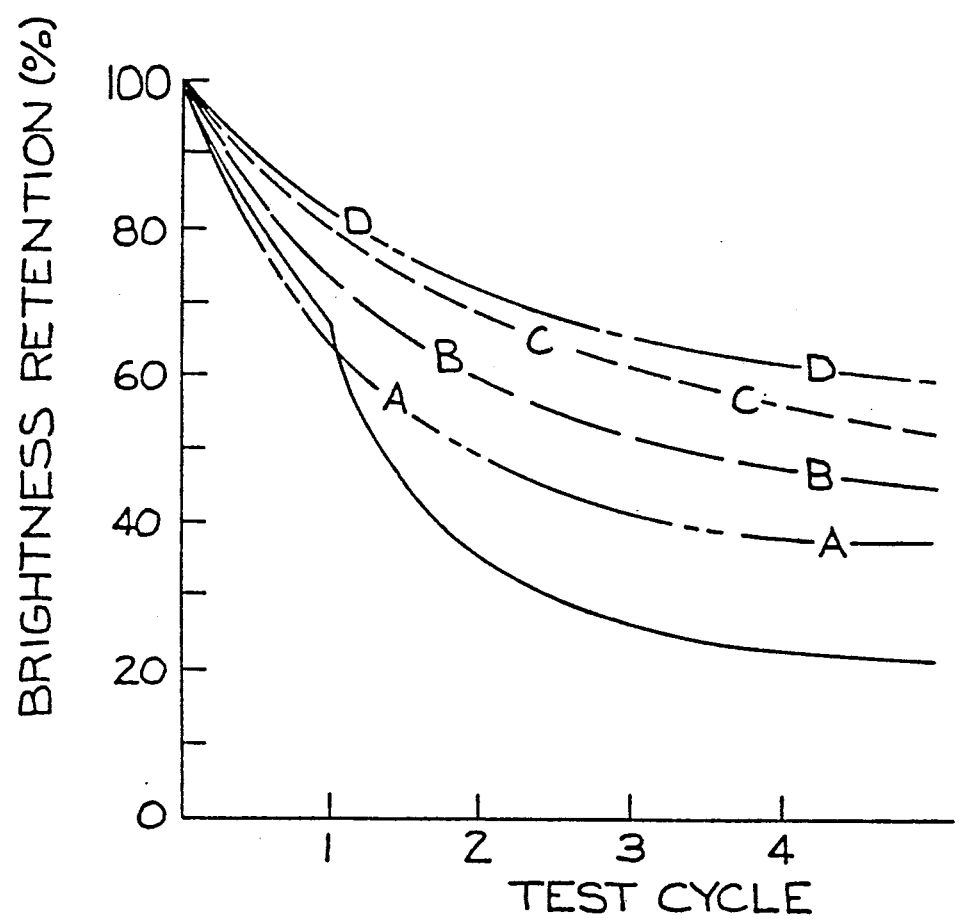
FIG. 3 is a graph of brightness retention vs. number of test cycles for retroreflective sheeting exposed to soil resistance test conditions to be explained hereinafter. All samples were exposed to the same conditions of dirt and oil splashing, and the graph represents loss of brightness over time. The solid line is for the control, Scotchlite 3870 reflective sheeting, and line A represents the same sheeting coated with NeoCryl A601 polymer. Lines B-D represent embodiments of the invention using NeoCryl A601 polymer and various amounts of silica in the protective coating.

Soil repellancy tests like those of Example II were also performed on samples of the inventive reflective sheeting using the acrylate polymers in the protective coating. The data for these tests are shown in FIG. 3. As in the case of FIG. 2, the specimens for lines B, C and D utilized 15 percent, 30 percent and 50 percent silica in the protective coating respectively. The figure shows that brightness retention of the inventive sheeting increases substantially as the proportion of colloidal silica is increased. Without the presence of the silica, specimen A, the soil resistance was poor, although somewhat better than the control.

Other embodiments of this invention will be apparent to those skilled in the art from a consideration of this specification or practice of the invention disclosed herein. Various omissions, modifications and changes to the principles described herein, may be made by one skilled in the art without departing from the true scope and spirit of the invention which is indicated by the following claims.

What is claimed is:

1. A process for making a retroreflective sheet having a protective silica coating comprising the steps of:
    A. preparing a protective coating composition by the steps of:
        1) providing a transparent polymeric composition selected from the group consisting of acrylic polymers having a glass transition temperature of −20° to 60° in aqueous emulsion containing at least one solvent having a boiling point higher than that of water;
        2) slowly mixing with the polymer from step (1) a silica sol, wherein the colloidal particle size is less than 50 nanometers, in such a proportion to the polymeric composition from step (1) that the $SiO_2$ content is 10-70 weight percent, of the total of $SiO_2$ plus the polymer solids from step (1);
    B. providing a retroreflective sheet and coating said retroreflective sheet with the protective coating composition from step A; and
    C. drying the coated retroreflective sheet from step B.

2. The process of claim 1 which further comprises exposing the retroreflective sheet of step B to corona discharge before it is coated with the protective coating composition.

3. A coating composition which produces a transparent coating, comprising a mixture of colloidal silica aquasol wherein colloid particle size is less than 50 nanometers and a polymer composition selected from the group consisting of aliphatic polyurethanes having a molecular weight greater than 20,000 in water dispersion, aliphatic polyurethanes having a molecular weight greater than 20,000 in organic solvent, and acrylic polymers having a weight average molecular weight in the range of 300,000 to 350,000 and a glass transition temperature of −20° to 60° C. in aqueous emulsion containing at least one solvent having a boiling point higher than that of water in which mixture the silica comprises: 30 to 80 weight percent of the total of silica plus polymer solids for aliphatic polyurethane polymers; and 30 to 70 weight percent in the case of acrylic polymers.

4. A coating composition comprising a mixture of colloidal silica aquasol wherein colloid particle size is less than 50 nanometers and a polymer composition selected from the group consisting of acrylic polymers having a weight average molecular weight in the range of 300,000 to 350,000 and a glass transition temperature of −20° to 60° C. in aqueous emulsion containing at least one solvent having a boiling point higher than that of water in which mixture the silica comprises 30 to 70 weight percent of the total of silica plus polymer solids.

5. A coating composition comprising a mixture of colloidal silica aquasol wherein colloid particle size is less than 50 nanometers and a polyvinyl chloride copolymer having a minor amount, not more than 15 weight percent, of a comonomer containing at least one carboxylic acid or hydroxyl moiety, in which mixture the silica comprises 10 to 80 weight percent of the total of silica plus polymer solids.

6. The coating composition of claim 5 wherein silica comprises 30 to 80 weight percent of the total of silica plus polymer solids.

* * * * *